United States Patent
Ko et al.

(10) Patent No.: US 6,410,657 B1
(45) Date of Patent: Jun. 25, 2002

(54) METHOD FOR THE SELECTIVE HYDROGENATION OF POLYMER CONTAINING CONJUGATED DIENE

(75) Inventors: Young Hoon Ko; Hoo Chae Kim; Jae Yun Kim; Jin Man Hwang, all of Taejon (KR)

(73) Assignee: Korea Kumho Petrochemical Co., LTD, Seoul (KR)

( * ) Notice: Subject to any disclaimer, the term of this patent is extended or adjusted under 35 U.S.C. 154(b) by 0 days.

(21) Appl. No.: 09/640,102

(22) Filed: Aug. 15, 2000

(30) Foreign Application Priority Data

Nov. 26, 1999 (KR) ............................. 99-53045

(51) Int. Cl.$^7$ ................................. C08F 8/04
(52) U.S. Cl. ............... 525/338; 525/332.8; 525/332.9; 525/333.1; 525/333.2; 525/339
(58) Field of Search ................... 525/338, 339

(56) References Cited

U.S. PATENT DOCUMENTS

| | | | |
|---|---|---|---|
| 3,670,054 A | | 6/1972 | De La Mare et al. |
| 4,501,857 A | | 2/1985 | Kishimoto et al. |
| 4,673,714 A | | 6/1987 | Kishimoto et al. |
| 4,980,421 A | | 12/1990 | Teramoto et al. |
| 5,039,755 A | | 8/1991 | Chamberlain et al. |
| 5,242,986 A | | 9/1993 | Gibler et al. |
| 5,583,185 A | | 12/1996 | Parellada Ferrer et al. |
| 5,814,709 A | * | 9/1998 | De Boer et al. ............ 525/338 |
| 5,886,107 A | * | 3/1999 | De Boer et al. ............ 525/338 |
| 5,925,717 A | * | 7/1999 | De Boer et al. ............ 525/338 |
| 5,994,477 A | * | 11/1999 | Ko et al. .................... 525/338 |
| 6,020,439 A | * | 2/2000 | Ko et al. .................... 525/338 |

OTHER PUBLICATIONS

Y. Zhang, S. Liao and Y. Xu, (1990) "Active hydrogenation catalysts from titanium complexes and alkali metal hydrides" *J.of Organ. Chem.*, 69–76;.

* cited by examiner

*Primary Examiner*—Bernard Lipman
(74) *Attorney, Agent, or Firm*—Davidson, Davidson & Kappel, LLC

(57) ABSTRACT

This invention relates to a method for the selective hydrogenation of the unsaturated double bonds in the conjugated diene units of a homopolymer or copolymer in the presence of a novel homogeneous organotitanium-based catalyst. Also, the process of this invention can demonstrate a high yield of hydrogenation and hydrogenation reproducibility using a novel catalyst, so prepared from a mixture consisting of a substituted or unsubstituted monocyclopentadienyl titanium compound expressed by the following formula 1 and lithium hydride derived from a reaction of both alkyl lithium and hydrogen in solution. In particular, this invention also relates to a novel method for the selective hydrogenation of unsaturated double bonds in the conjugated diene units of a conjugated diene polymer or copolymer, so prepared via the reaction between a conjugated diene monomer and vinyl-substituted aromatic monomer Formula 1

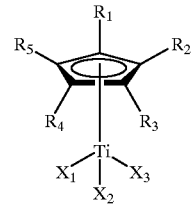

wherein, $R_1$, $R_2$, $R_3$, $R_4$ and $R_5$, which may be same or different, are selected from hydrogen atoms and alkyl groups of 1~5 carbon atoms; $X_1$, $X_2$ and $X_3$, which may be same or different, are selected from halogen atoms.

17 Claims, No Drawings

METHOD FOR THE SELECTIVE HYDROGENATION OF POLYMER CONTAINING CONJUGATED DIENE

FIELD OF THE INVENTION

This invention relates to a method for the hydrogenation of a conjugated diene polymer, and more particularly, to the method for the selective hydrogenation of the unsaturated double bonds of conjugated diene polymer or copolymer using lithium hydride (LiH) as a reducing agent, so prepared from the reaction between organolithium compound and hydrogen, and an organotitanium compound in solution as the main catalyst, so as to improve its weatherability and oxidation resistance; thus representing an extremely high hydrogenation yield with remarkable hydrogenation reproducibility and selectivity.

DESCRIPTION OF THE RELATED ART

A conjugated diene homopolymer (e.g., 1,3-butadiene or isoprene) or a copolymer, so prepared via the reaction between a conjugated diene monomer and a vinyl aromatic monomer (e.g., styrene, etc.), is being widely used as an elastomer.

These polymers having the double bonds in their internal chain may be vulcanized but these double bonds may adversely cause the poor weatherability and the poor oxidation resistance of polymer.

Meantime, some block copolymers, so prepared via the reaction between a conjugated diene monomer and vinyl aromatic monomer, are being widely used as a modifier for transparent impact-resistant resin or polyolefin and polystyrene resin.

The polymers containing the olefinic unsaturated double bonds can be effectively used through a vulcanization process of the unsaturated double bonds but these double bonds raises some adverse drawbacks associated with a heat resistance, an oxidation resistance and weatherability.

Under the above circumstances, these polymers need to be used within limited scope of application, while not being exposed to the external environment. In an effort to improve the weatherability and oxidation resistance of polymers having the unsaturated double bonds, a process for partially or completely hydrogenating the double bonds in the polymers may, be generally adopted.

Several methods intended for the hydrogenation of the olefinic double bonds of polymer have been reported, which are largely classified by the following two methods.

The first method is to use a heterogeneous catalyst, and the second method is to use a homogenous catalyst such as Zeigler catalyst or an organometallic compound such as rhodium or titanium.

The hydrogenation method using a heterogeneous catalyst is performed in such a manner that olefinic polymer dissolved in a suitable solvent is contacted with hydrogen in the presence of a heterogeneous catalyst but such contact between reactants and catalyst is not easily made available due to some factors such as the steric hindrance of polymer and relatively high viscosity. Furthermore, once hydrogenation is successfully achieved due to strong adsorption of both the polymer and catalyst, their not easily detachable bonding characteristics make other unhydrogenated polymers extremely difficult to reach the active site of catalyst. To hydrogenate the unsaturated double bonds of polymer completely, excessive amount of catalyst should be required under severe reaction conditions of high temperature and pressure. As a result, the decomposition and gelation of polymer may be occasionally occurred.

Moreover, under the above severe reaction conditions, the selective hydrogenation of olefinic polymer is extremely difficult in that in the case of a copolymer, so prepared from a conjugated diene monomer and vinyl aromatic monomer, the hydrogenation of double bonds in an aromatic compound is simultaneously performed.

Furthermore, the physical separation of catalyst from a hydrogenated polymer solution is extremely difficult; in the case of a certain heterogeneous catalyst, its complete removal is impossible due to its strong adsorption with a polymer.

By contrast, the hydrogenation method using a homogeneous catalyst is more advantageous than using heterogeneous catalyst, since the catalytic activity is high and a high degree of yield can be expected under a mild condition such as a low temperature and pressure.

In addition, under an appropriate hydrogenation condition, the selective hydrogenation of olefinic double bonds only may be performed except for aromatic one from the chains of copolymer, so prepared from the reaction between a vinyl aromatic hydrocarbon and a conjugated diene.

Nonetheless, the method for hydrogenating the double bonds of a conjugated diene polymer using a homogeneous catalyst has recognized some disadvantages in that a) the stability of a catalyst itself is low, b) the separation of a catalyst decomposed from a hydrogenated polymer is extremely difficult, and c) after hydrogenation, the microstructure of polymer may be adversely affected.

Meantime, several methods to selectively hydrogenate the unsaturated double bonds of. conjugated diene polymer have been disclosed as set forth hereunder.

The U.S. Pat. Nos. 3,494,942, 3,670,054 and 3,700,633 have disclosed a method for using some well-known suitable catalysts containing the metals belong to 8, 9 and 10 groups or a precursor of catalyst, so as to hydrogenate and/or selectively hydrogenate a polymer containing the unsaturated double bonds of ethylene and a copolymer containing the unsaturated double bonds of both aromatic compound and ethylene.

From the above-mentioned patents, the catalyst is prepared by mixing some metals belonging to 9, 10 groups (especially, nickel or cobalt compound) with a suitable reducing agents such as aluminum alkyl. Besides, the prior art indicates that from the periodic table of the elements, some metals belonging to 1, 2 and 13 groups (especially, lithium, magnesium and aluminum alkyl or metal hydrides) are effectively used as reducing agents. Hence, some metals belonging to 1, 2 and 13 groups and some reducing agents belonging to 8, 9 and 10 groups are mixed in the molar ratio of 0.1:1~20:1, more preferably in the range of 1:1~10:1.

The U.S. Pat. No. 4,501,857 has disclosed a selective hydrogenation of unsaturated. double bonds in a conjugated diene polymer in the presence of (A) at least one bis-(cyclopentadienyl)titanium compound and (B) at least one hydrocarbon lithium compound.

Further, the U.S. Pat. No. 4,980,421 has disclosed a similar hydrogenation effect using either a direct use of a alcoholic or a phenolic compound or a reaction mixture between an organolithium compound and a alcoholic or a phenolic compound, with bis-(cyclopentadienyl)titanium compound as a main catalyst. Hence, even though a small amount of catalyst is used not to adversely affect the stability of polymer to be hydrogenated, its catalytic activity is quite effective.

The U.S. Pat. No. 4,673,714 has disclosed a process for selectively hydrogenating unsaturated double bonds of the diene units of a conjugated diene polymer and copolymer in the presence of bis-(cyclopentadienyl)titanium compound but in the absence of alkyl lithium compounds. The detailed example of such titanium compound includes a bis-(cyclopentadienyl)titanium diaryl compound, while the catalyst system is characterized by the non-use of a hydrocarbon lithium compound.

Further, the U.S. Pat. No. 5,039,755 has disclosed a process for the hydrogenation of a conjugated diene polymer which was made by polymerizing or copolymerizing at least one conjugated diene monomer with an organo alkali metal as a polymerization initiator in a suitable solvent, thereby creating a living polymer and terminating the polymerization by the addition of hydrogen and effecting selective hydrogenation of the unsaturated double bonds in the conjugated diene units of the terminated polymer by contacting the polymer in the presence of $(C_5H_5)_2TiR_2$ (R=arylalkyl group) catalyst.

The U.S. Pat. No. 5,242,986 has disclosed that the double bonds in the conjugated diene units of styrene-butadiene-isoprene copolymer may be selectively hydrogenated using a specific titanocene compound and a reducing agent.

Further, the U.S. Pat. No. 5,583,185 has disclosed a method for hydrogenating the double bonds of conjugated diene units of polymer using $Cp_2Ti(PhOR)_2$ (wherein, Cp is cyclopentadienyl; OR is an alkoxy compound of 1 to 4 carbon atoms) or $Cp_2TiR_2$(wherein, R is $CH_2PPh_2$) as a homogeneous catalyst.

In addition, some literature (Journal of Organometallic Chemistry, 382 (1990) 69–76) has disclosed a method for hydrogenating an olefinic monomer using a catalyst containing a mixture of $Cp_2TiCl_2$ or $(C_6H_{10}(p-CH_3OC_6H_4)C_5H_4)_2TiCl_2$ with alkali metal hydride (MH) having a high degree of activity (MH), so prepared in solution.

However, the above-described homogeneous catalyst has recognized some disadvantages in that a) since it is in general extremely sensitive to the outer circumstances, the catalyst may be easily decomposed in air, and b) the hydrogenation activity may greatly vary depending upon the reduction state of catalyst. In consequence, it is very difficult to satisfy the high degree of hydrogenation yield and reproducibility simultaneously. Further, in parallel with the progress of the reaction, the catalytic species tend to decompose to the inactive forms, whereby the reduced hydrogenation activity may be responsible for a poor reproducibility in the reaction. In addition, in the case of a homogeneous catalyst, the hydrogenation yield may be greatly influenced depending upon the stability of catalyst during the hydrogenation.

Now that the industrial application of a homogeneous catalyst in the hydrogenation of polymer has faced the above problems, there are strong needs for the development of a highly active hydrogenation catalyst with better stability and reproducibility.

SUMMARY OF THE INVENTION

To overcome the shortcomings in hydrogenating the unsaturated double bonds of a conjugated diene polymer when the homogeneous catalyst is used, an object of this invention is to provide a hydrogenation method using a novel catalyst so as to prepare a hydrogenated polymer with a high degree of hydrogenation yield and reproducibility, without any drawbacks the existing homogeneous hydrogenation catalysts have encountered.

To achieve the above objective, this invention is characterized by a method for the selective hydrogenation of polymer containing conjugated diene in hydrogenating the double bonds only in the conjugated dienes of polymer, which is selected from a homopolymer of conjugated diene monomer or a copolymer consisting of a conjugated diene monomer and aromatic vinyl monomer, wherein it comprises:

1) at least one conjugated diene is individually polymerized or copolymerized to create a living polymer using an organolithium compound as initiator;

2) the end of the living polymer, so formed, is terminated using an equimolar amount of an end-modifying material; and, 3) a monocyclopentadienyl titanium compound (catalyst) expressed by the following formula 1 and lithium hydride (LiH), so prepared via the reaction between an organolithium compound and hydrogen are added to the polymer in solution whose end is modified but lithium hydride may be added individually or in a mixed form with catalyst by premixing and then the conjugated diene containing polymer is selectively hydrogenated under hydrogen pressure.

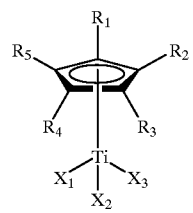

Formula 1 wherein, $R_1$, $R_2$, $R_3$, $R_4$ and $R_5$, which may be same or different, are selected from hydrogen atoms and alkyl groups of 1~5 carbon atoms; $X_1$, $X_2$ and $X_3$, which may be same or different, are selected from halogen atoms.

DETAILED DESCRIPTION OF THE INVENTION

The hydrogenation catalyst used for this invention is prepared via the mixing process of a substituted or unsubstituted monocyclopentadienyl titanium compound expressed by the formula 1 and lithium hydride (LiH), so obtained from the reaction between an organolithium compound and gaseous hydrogen in solution.

In particular, lithium hydride is prepared via the reaction between n-butyl lithium or s-butyl lithium and gaseous hydrogen in solution.

The hydrogenation is performed in such a manner that the substituted or unsubstituted monocyclopentadienyl titanium compound expressed by the formula 1 and lithium hydride are independently added to a polymer whose end is modified, or a mixing solution, so formed under an inert gas, is added to a polymer, followed by the addition of hydrogen.

According to this invention, it is preferred that the amount of lithium hydride is added in the molar ratio of 3~30 to monocyclopentadienyl titanium compound.

The detailed examples of the substituted or unsubstituted monocyclopentadienyl titanium compound expressed by the formula 1 include cyclopentadienyl titanium trichloride, cyclopentadienyl titanium trifluoride, cyclopentadienyl titanium tribromide, cyclopentadienyl titanium triiodide, pentamethylcyclopentadienyl titanium trichloride, pentamethylcyclopentadienyl titanium tribromide, pentamethylcyclopentadienyl titanium trifluoride and pentamethylcyclopentadienyl titanium triiodide. These compounds may be used in a single or mixed form.

The suitable amount of the hydrogenation catalyst is in the range of 0.01~20 mmol per 100 g of polymer, more preferably in the range of 0.05~5 mmol per 100 g of polymer.

The hydrogenation catalyst may hydrogenate the unsaturated double bonds of a conjugated diene polymer having a molecular weight of 500~1,000,000 or unsaturated double bonds of conjugated diene unit of random, tapered or block copolymer prepared from a copolymer comprising a conjugated diene monomer and a copolymerizable vinyl-substituted aromatic monomer.

As well noted earlier, a polymer containing the unsaturated olefinic double bonds and an optional unsaturated aromatic double bonds may be prepared by a polymerization of the conjugated diene monomer or by a copolymerization using one or more alkenyl aromatic hydrocarbon monomers.

The copolymer may be a random block, tapered block or its combination including a linear, star shape or radial shape.

The homopolymer containing the unsaturated olefinic double bonds or the copolymer containing the unsaturated double bonds of both aromatic monomer and the conjugated diene monomer may be prepared by an anionic initiator such as an organolithium compound or Ziegler-Natta catalyst. The manufacture of the polymer may be made available via the commonly available method such as bulk, solution or emulsion technique.

According to this invention, the examples of the conjugated diene, which may be polymerized as an anionic form, include a conjugated diene-based compound of 4 to 12 carbon atoms such as 1,3-butadiene, isoprene, piperylene, phenylbutadiene, 3,4-dimethyl-1,3-hexadiene and 4,5-diethyl-1,3-octadiene; it is preferred to use a conjugated diolefin of 4 to 9 carbon atoms.

Further, the examples of the alkenyl aromatic hydrocarbon compound, which may be copolymerized with a conjugated diene compound, includes styrene, styrene compounds substituted into various alkyl or alkoxy groups, and vinyl aryl compounds such as 2-vinyl pyridine, 4-vinyl pyridine, vinyl naphthalene and an alkyl group substituted vinyl naphthalene.

A living polymer is created via a homopolymerization or copolymerization using at least one or more compounds selected from the conjugated diene compound or vinyl aromatic compound in the presence of an organolithium compound as initiator.

According to this invention, it is preferred that an aromatic vinyl monomer and a conjugated diene monomer is mixed in the ratio of 0.5:9.5~9.5:0.5.

Further, the detailed example of the organolithium compound as initiator includes n-butyl lithium or s-butyl lithium.

Thereafter, the end of the living polymer, so formed, is deactivated using an equimolar amount of an end-modifying material. According to this invention, the end-modifying materials can be selected from the groups consisting of amine compounds, alcoholic compounds, ester compounds, ketone compounds and halogen compounds. The detailed examples of the end-modifying materials include the one selected from the group consisting of benzylchloride, benzylbromide, benzylidodide, methyl chloride, methyl bromide, methyl iodide, ethyl chloride, ethyl bromide, ethyl iodide, butyl chloride, butyl bromide, butyl iodide, acetone, methylisobutylketone, diphenylketone, methanol, ethanol, isopropyl alcohol, butanol, phenol, cresol, 2,6di-t-butyl 4-methyl phenol, ethyl acetate, butyl acetate, trimethylsilylfluoride, trimethylsilylchloride, trimethylsilylbromide, trimethylsilyliodide, triethylsilylfluoride, triethylsilylchloride, triethylsilylbromide, triethylsilyliodide, tributylsilylfluoride, tributylsilylchloride, tributylsilylbromide, tributylsilyliodide, triphenylsilylfluoride, triphenylsilylchloride, triphenylsilylbromide and triphenylsilyliodide.

The hydrogenation of this invention is performed using the polymer, so obtained via the polymerization of conjugated diene monomer in an inert solvent.

According to this invention, the inert solvent refers to a solvent, which is not reacted with any reactant in polymerization or hydrogenation. The examples of the appropriate solvent include aliphatic hydrocarbons such as n-pentane, n-hexane, n-heptane and n-octane; aliphatic-cyclic hydrocarbons such as cyclohexane and cycloheptane; and ethers such as diethylether and tetrahydrofuran. These compounds may be employed individually or in a mixed form.

Further, other aromatic hydrocarbons such as benzene, toluene, xylene and ethylbenzene may be employed under a predetermined condition, provided that any hydrogen is not added to the double bonds of an aromatic compound.

The hydrogenation of this invention is performed in such a manner that the concentration of polymer in proportion to a solvent is in the range of 1~50 wt %, preferably in the range of 5~25 wt %.

Meantime, the hydrogenation of this invention is performed in such a manner that after being left at a constant temperature under the atmosphere of hydrogen or inert gas, hydrogenation catalysts are added to a polymer solution under stirring or not; then, hydrogen gas is added under a constant pressure. Further, the appropriate amount of catalyst(formula I) during hydrogenation is in the range of 0.01~20 mmol per 100 g of polymer to be hydrogenated, more preferably in the range of 0.05~5 mmol per 100 g of polymer.

The examples of the inert gas include helium, nitrogen and argon, which are not reacted with any reactant during hydrogenation. Hence, the use of air or oxygen is not appropriate since it oxidizes or decomposes the hydrogenation catalyst, thus reducing the catalyst activity.

In general, the hydrogenation is performed in the range of 0~150° C. If the hydrogenation temperature is lower than 0° C., a large amount of catalyst should be required due to the low activity of catalyst at 0° C., which makes the process uneconomical, moreover a polymer may be easily precipitated due to insolubility at the low temperature. However, in case of exceeding 150° C., the catalyst activity is reduced, and the gelation or decomposition of polymer may be easily induced; in addition, since the double bonds of an aromatic compound could be also hydrogenated, the selectivity of hydrogenation would be reduced. More preferably, the reaction temperature is in the range of 50~140° C.

Further, the appropriate pressure of hydrogen in the reaction is in the range of 1~100 kg/cm$^2$, even though it is not specially restricted. If the pressure of hydrogen is less than 1 kg/cm$^2$, the hydrogenation rate becomes slow but in case of exceeding 100 kg/cm$^2$, unnecessary gelation as side reaction may be actually induced. More preferably, the pressure of hydrogen is in the range of 2~30 kg/cm$^2$. According to this invention, an optimum pressure of hydrogen is selected depending on various hydrogenation conditions such as catalyst amount; if the catalyst amount is small, it is actually preferred to adopt a higher pressure of hydrogen.

Further, the hydrogenation time of this invention usually ranges from several minutes to 1440 minutes, more preferably in the range of 30–360 minutes. In the case of selecting other hydrogenation conditions, the hydrogenation time is appropriately determined in consideration of the above conditions. The hydrogenation of this invention may be performed by a batch method or continuous method.

The hydrogenation progress of this invention may be well traced by the consumption amount of hydrogen.

According to this invention, the hydrogenation yield of unsaturated double bonds in the conjugated diene units of polymer can be attained by more than 50%, more preferably up to 90%. More preferably, in case where a copolymer, so prepared via a reaction between a conjugated diene and vinyl-substituted aromatic hydrocarbon compound, the hydrogenation yield of unsaturated double bonds in the conjugated diene units of polymer can be also attained by more than 90% and at the same time, the hydrogenation yield of unsaturated double bonds in an aromatic compound is less than 5%; thus, it is possible to obtain the hydrogenated copolymer whose unsaturated double bonds in the conjugated diene units are selectively hydrogenated. As mentioned above, when a conjugated diene polymer is hydrogenated using a novel catalyst having a very high activity, the hydrogenation can be performed under a mild condition. In particular, in the case of a copolymer, so prepared via a reaction between a conjugated diene compound and vinyl-substituted aromatic hydrocarbon compound, the unsaturated double bonds of the conjugated diene units can be selectively hydrogenated to a great extent. Further, since this invention employs a conjugated diene polymer as a raw material, the following hydrogenation in the same reactor can be performed and at the same time, the fact that a small amount of catalyst can demonstrate a high degree of activity proves that this invention is economically feasible and with an easier process, advantageous in the industrial field.

This invention is explained in more detail based on the following examples but is not limited by these examples.

<Preparation of Catalyst>

Preparation 1: Lithium Hydride(LiH)

3.5 l n-butyl lithium solution or s-butyl lithium solution (0.2M cyclohexane solution) was placed in a 5 l autoclave reactor under nitrogen, followed by the addition of 0.5 l tetrahydrofuran. While maintaining the temperature of a reactor at room temperature, the reaction mixture was stirred at 500 rpm and by the addition of gaseous hydrogen, left for 1 hours under the constant hydrogen pressure of 10 kg/cm$^2$. After the lapse of 1 hour, the solution turned into a white suspension. The end-point of reaction was determined by a macroscopic confirmation of no color change after some solution, so collected, was reacted with a styrene monomer. If an unreacted alkyl lithium remained in the solution, the color turned into yellow via the polymerization with a styrene monomer.

Preparation 2: Cyclopentadienyl Titanium Trichloride in Solution

A commercially available cyclopentadienyl titanium trichloride is dissolved in an anhydrous toluene to make a 0.1M solution.

Preparation 3: Pentamethyl Cyclopentadienyl Titanium Trichloride in Solution

A commercially available pentamethyl cyclopentadienyl titanium trichloride is dissolved in an anhydrous toluene to make a 0.1M solution.

<Preparation of Polymer>

Preparation 4: Synthesis for Styrene-butadiene-styrene Block Copolymer Treated with Benzyl Chloride 4800 g of cyclohexane was placed in a 10 l autoclave reactor, followed by the addition of 11 g of tetrahydrofuran, 124 g of styrene monomer and 16 mmol of n-butyl lithium for 30-minute polymerization. Then, 552 g of 1,3-butadiene monomer were added to the reactor for another polymerization for 1 hour. Also, 124 g of styrene monomer were added for further polymerization for 30 minutes, followed by the addition of 2.0 g of benzyl chloride to deactivate the terminal of the living polymer. Thus, a styrene-butadiene-styrene block copolymer, so obtained, had the following characteristics: 31.0% as a combined content of styrene (block styrene content: 30.0%), 38.5% as a combined 1,2 vinyl content of butadiene unit, and a number average molecular weight of about 50,000.

Preparation 5: Synthesis for Styrene-butadiene-styrene Block Copolymer Treated with t-butyl Chloride 4800 g of cyclohexane was placed in a 10 l autoclave reactor, followed by the addition of 11 g of tetrahydrofuran, 124 g of styrene monomer and 16 mmol of n-butyl lithium for 30-minute polymerization. Then, 552 g of 1,3-butadiene monomer were added to the reactor for another polymerization for 1 hour. Also, 124 g of styrene monomer were added for further polymerization for 30 minutes, followed by the addition of 1.5 g of t-butyl chloride to deactivate the terminal of polymer. Thus, a styrene-butadiene-styrene block copolymer, so obtained, had the following characteristics: 31.0% as a combined content of styrene (block styrene content: 30.0%), 38.5% as a combined 1,2 vinyl content of butadiene unit, and a number average molecular weight of about 50,000.

Preparation 6: Synthesis for Styrene-butadiene-styrene Block Copolymer Treated with Isopropyl Alcohol 4800 g of cyclohexane was placed in a 10 l autoclave reactor, followed by the addition of 11 g of tetrahydrofuran, 124 g of styrene monomer and 16 mmol of n-butyl lithium for 30-minute, polymerization. Then, 552 g of 1,3-butadiene monomer were added to the reactor for another polymerization for 1 hour. Also, 124 g of styrene monomer were added for further polymerization for 30 minutes, followed by the addition of 1.0 g of isopropyl alcohol to deactivate the terminal of polymer. Thus, a styrene-butadiene-styrene block copolymer, so obtained, had the following characteristics: 31.0% as a combined content of styrene (block styrene content: 30.0%), 38.5% as a combined 1,2 vinyl content of butadiene unit, and a number average molecular weight of about 50,000.

Preparation 7: Synthesis for Styrene-butadiene-styrene Block Copolymer Treated with Acetone 4800 g of cyclohexane was placed in a 10 l autoclave reactor, followed by the addition of 11 g of tetrahydrofuran, 124 g of styrene monomer and 16 mmol of n-butyl lithium for 30-minute polymerization. Then, 552 g of 1,3-butadiene monomer were added to the reactor for another polymerization for 1 hour. Also, 124 g of styrene monomer were added for further polymerization for 30 minutes, followed by the addition of 0.9 g of acetone to deactivate the terminal of polymer. Thus, a styrene-butadiene-styrene block copolymer, so obtained, had the following characteristics: 31.0% as a combined content of styrene (block styrene content: 30.0%), 38.5% as a combined 1,2 vinyl content of butadiene unit, and a number average molecular weight of about 50,000.

Preparation 8: Synthesis for Styrene-butadiene-styrene Block Copolymer Treated with Arylchloride 4800 g of cyclohexane was placed in a 10 l autoclave reactor, followed by the addition of 11 g of tetrahydrofuran, 124 g of styrene monomer and 16 mmol of n-butyl lithium for 30-minute polymerization. Then, 552 g of 1,3-butadiene monomer were added to the reactor for another polymerization for 1 hour. Also, 124 g of styrene monomer was added for further polymerization or 30 minutes, followed by the addition of 1.2 g of arylchloride to deactivate the terminal of polymer. Thus, a styrene-butadiene-styrene block copolymer, so obtained, had the following characteristics: 31.0% as a combined content of styrene (block styrene content: 30.0%), 38.5% as a combined 1,2 vinyl content of butadiene unit, and a number average molecular weight of about 50,000.

Preparation 9: Synthesis for Styrene-butadiene-styrene Block Copolymer Treated with Trimethylsilylchloride 4800 g of cyclohexane was placed in a 10 l autoclave reactor, followed by the addition of 11 g of tetrahydrofuran, 124 g of styrene monomer and 16 mmol of n-butyl lithium for 30-minute polymerization. Then, 552 g of 1,3-butadiene monomer were added to the reactor for another polymerization for 1 hour. Also, 124 g of styrene monomer was added for further polymerization for 30 minutes, followed by the addition of 1.7 g of trimethylsilylchloride to inactivate the terminal of polymer. Thus, a styrene-butadiene-styrene block copolymer, so obtained, had the following characteristics: 31.0% as a combined content of styrene (block styrene content: 30.0%), 38.5% as a combined 1,2 vinyl content of butadiene unit, and a number average molecular weight of about 50,000.

Preparation 10: Synthesis for styrene-butadiene-styrene Block Copolymer Treated with Methyl Bromide 4800 g of cyclohexane was placed in a 10 l autoclave reactor, followed by the addition of 11 g of tetrahydrofuran, 124 g of styrene monomer and 16 mmol of n-butyl lithium for 30-minute polymerization. Then, 552 g of 1,3-butadiene monomer were added to the reactor for another polymerization for 1 hour. Also, 124 g of styrene monomer was added for further polymerization for 30 minutes, followed by the addition of 1.5 g of methyl bromide to inactivate the terminal of polymer. Thus, a styrene-butadiene-styrene block copolymer, so obtained, had the following characteristics: 31.0% as a combined content of styrene (block styrene content: 30.0%), 38.5% as a combined 1,2 vinyl content of butadiene unit, and a number average molecular weight of about 50,000.

Preparation 11: Synthesis for Styrene-butadiene-styrene Block Copolymer Treated with t-benzylchloride 4800 g of cyclohexane was placed in a 10 l autoclave reactor, followed by the addition of 11 g of tetrahydrofuran, 124 g of styrene monomer and 16 mmol of n-butyl lithium for 30-minute polymerization. Then, 552 g of 1,3-butadiene monomer were added to the reactor for another polymerization for 1 hour. Also, 124 g of styrene monomer was added for further polymerization for 30 minutes, followed by the addition of 1.9 g of benzylchloride to deactivate the terminal of polymer. Thus, a styrene-butadiene-styrene block copolymer, so obtained, had the following characteristics: 31.0% as a combined content of styrene (block styrene content: 30.0%), 38.5% as a combined 1,2 vinyl content of butadiene unit, and a number average molecular weight of about 50,000.

Preparation 12: Synthesis for Styrene-butadiene Random Copolymer Treated with t-butyl Chloride 5000 g of cyclohexane was placed in a 10 l autoclave reactor, followed by the addition of 100 g of tetrahydrofuran, 130 g of styrene monomer, 870 g of butadiene monomer and 10 mmol of n-butyl lithium for one-hour polymerization. Then, 0.9 g of t-butyl chloride was added to the mixing solution to deactivate the terminal of polymer. Thus, a styrene-butadiene random copolymer, so obtained, had the following characteristics: 13% as a combined content of styrene, 57% as a combined 1,2 vinyl content of butadiene unit, and a number average molecular weight of about 100,000.

Preparation 13: Synthesis for Single Butadiene Polymer Treated with t-butyl Chloride 5000 g of cyclohexane was placed in a 10 l autoclave reactor, followed by the addition of 1000 g of butadiene monomer and 10 mmol of n-butyl lithium for two-hour polymerization. Then, 0.9 g of t-butyl chloride was added to the mixing solution to deactivate the terminal of polymer. Thus, a single butadiene polymer, so obtained, had the following characteristics: 10% as a combined 1,2 vinyl content of butadiene unit, 35% of combined cis content and a number average molecular weight of about 100,000.

Preparation 14: Synthesis for Single Isoprene Polymer Treated with t-butyl Chloride 5000 g of cyclohexane was placed in a 10 l autoclave reactor, followed by the addition of 1000 g of isoprene monomer and 10 mmol of n-butyl lithium for two-hour polymerization. Then, 0.9 g of t-butyl chloride was added to the mixing solution to deactivate the terminal of polymer. Thus, a single butadiene polymer, so obtained, had the following characteristics: 10% as a combined 1,2 vinyl content of isoprene unit, and a number average molecular weight of about 100,000.

<Hydrogenation of Polymer Containing Conjugated Diene>

EXAMPLES 1~6

A solution (2800 g) containing 400 g of polymer, so obtained from preparation 4~9 was placed in a 5 l autoclave reactor and stirred at 400 rpm at 60° C. Then, 10 mmol of lithium hydride, so obtained from preparation 1, was added to the polymer solution in an autoclave reactor, followed by the addition of 2.0 mmol (0.1M in toluene) of cyclopentadienyl titaniumtrichloride, so obtained from preparation 2. The reactor was pressurized under 10 kg/cm$^2$ of hydrogen to maintain the hydrogenation for 3 hours. After the reaction was completed, the reactor was cooled with its pressure reduced at atmospheric pressure. The resulting solution was added to methanol for precipitation of a hydrogenated polymer.

From $^1$H-NMR results of the hydrogenated polymer, so obtained, each hydrogenation rate of butadiene and styrene units was shown in the following table 1.

TABLE 1

| | Example | | | | | |
|---|---|---|---|---|---|---|
| | 1 | 2 | 3 | 4 | 5 | 6 |
| Preparation | 4 | 5 | 6 | 7 | 8 | 8 |
| Hydrogen pressure (kg/cm$^2$) | 10 | 10 | 10 | 10 | 10 | 10 |
| Hydrogenation yield of butadiene unit (%) | 99 | 99 | 99 | 99 | 99 | 99 |
| Hydrogenation yield of styrene unit (%) | <1 | <1 | <1 | <1 | <1 | <1 |

EXAMPLES 7~11

The hydrogenation was performed in the same manner as Example 1 using the polymers, so obtained from preparation 10~14, except for the fact that in the case of preparation 13 and 14, each amount of cyclopentadienyl titanium trichloride and lithium hydride was more increased two times than Example 1. The results were shown in the following table 2.

TABLE 2

| | Example | | | | |
|---|---|---|---|---|---|
| | 7 | 8 | 9 | 10 | 11 |
| Preparation | 10 | 11 | 12 | 13 | 14 |
| Hydrogen pressure (kg/cm$^2$) | 10 | 10 | 10 | 10 | 10 |
| Hydrogenation yield of butadiene (isoprene) unit (%) | 99 | 99 | 98 | 98 | 99 |
| Hydrogenation yield of styrene unit (%) | <1 | <1 | <1 | — | — |

EXAMPLES 12~16

A solution (2800 g) containing 400 g of polymer, so obtained from preparation 9 was placed in a 5 l autoclave reactor and stirred at 400 rpm at 60° C. With well-controlled amount and molar ratio, both lithium hydride, so obtained from preparation 1 and catalyst, so obtained from preparation 2, were added to the polymer solution. The reactor was pressurized under 10 kg/cm$^2$ of hydrogen to maintain the hydrogenation for 3 hours. After the reaction was completed, the reactor was cooled with its pressure reduced at atmospheric pressure. The resulting solution was added to methanol for precipitation of a hydrogenated polymer.

From $^1$H-NMR results of the hydrogenated polymer, so obtained, each hydrogenation rate of butadiene and styrene units was shown in the following table 3.

TABLE 3

| | Example | | | | |
|---|---|---|---|---|---|
| | 12 | 13 | 14 | 15 | 16 |
| Manufacturing example | 9 | 9 | 9 | 9 | 98 |
| Hydrogen pressure (kg/cm$^2$) | 10 | 10 | 10 | 10 | 10 |
| Catalyst amount (mmol per 100 g of polymer) | 0.1 | 0.2 | 0.5 | 0.2 | 0.5 |
| Molar ratio of LiH/Ti | 10 | 10 | 10 | 8 | 15 |
| Hydrogenation yield of butadiene unit (%) | 98 | 99 | 100 | 97 | 100 |
| Hydrogenation yield of styrene unit (%) | <1 | <1 | <1 | <1 | <1 |

EXAMPLES 17~19

The hydrogenation was performed using the polymer, so obtained from preparation 9 and pentamethylcyclopentadienyl titanium trichloride, so obtained from preparation 3, while controlling the amount and molar ratio of lithium hydride (LiH) in the same manner as Example 12.

From $^1$H-NMR results of the hydrogenated polymer, so obtained, each hydrogenation rate of butadiene and styrene units was shown in the following table 4.

TABLE 4

| | Example | | |
|---|---|---|---|
| | 17 | 18 | 19 |
| Manufacturing example of polymer | 9 | 9 | 9 |
| Hydrogen pressure (kg/cm$^2$) | 10 | 10 | 10 |
| Catalyst amount (mmol per 100 g of polymer) | 0.1 | 0.2 | 0.5 |
| Molar ratio of LiH/Ti | 10 | 10 | 10 |

TABLE 4-continued

| | Example | | |
|---|---|---|---|
| | 17 | 18 | 19 |
| Hydrogenation yield of butadiene unit (%) | 99 | 99 | 100 |
| Hydrogenation yield of styrene unit (%) | <1 | <1 | <1 |

EXAMPLES 20~24

A solution (2800 g) containing 400 g of polymer, so obtained from preparation 9 was placed in a 5 l autoclave reactor and stirred at 400 rpm at 80° C. With the well-controlled amount and molar ratio, both lithium hydride, so obtained from preparation 1 and catalyst, so obtained from preparation 2, were mixed in Schlenck tube in an inert gas and added to the polymer solution. The reactor was pressurized under 10 kg/cm$^2$ of hydrogen to maintain the hydrogenation for 3 hours. After the reaction was completed, the reactor was cooled with its pressure reduced at atmospheric pressure. The resulting solution was added to methanol for precipitation of a hydrogenated polymer.

From $^1$H-NMR results of the hydrogenated polymer, so obtained, each hydrogenation rate of butadiene and styrene units was shown in the following table 3.

TABLE 5

| | Example | | | | |
|---|---|---|---|---|---|
| | 20 | 21 | 22 | 23 | 24 |
| Manufacturing example of polymer | 9 | 9 | 9 | 9 | 98 |
| Hydrogen pressure (kg/cm$^2$) | 10 | 10 | 10 | 10 | 10 |
| Catalyst amount (mmol per 100 g of polymer) | 0.1 | 0.2 | 0.4 | 0.2 | 0.4 |
| Molar ratio of LiH/Ti | 10 | 10 | 10 | 5 | 8 |
| Hydrogenation yield of butadiene unit (%) | 96 | 97 | 99 | 97 | 98 |
| Hydrogenation yield of styrene unit (%) | <1 | <1 | <1 | <1 | <1 |

As above-described in more detail, when a conjugated diene polymer is hydrogenated using a novel catalyst, so prepared from a mixture consisting of a substituted or unsubstituted monocyclopentadienyl titanium compound expressed by the formula 1 and lithium hydride derived from a reaction of both alkyl lithium and hydrogen in solution, the unsaturated double bonds of a conjugated diene polymer can be hydrogenated under a mild condition. In particular, in the case of a copolymer, so prepared via a reaction between a conjugated diene compound and vinyl-substituted aromatic hydrocarbon compound, the unsaturated double bonds of the conjugated diene units tan be selectively hydrogenated to a great extent. Further, since this invention employs a conjugated diene polymer as a raw material, the following hydrogenation in the same reactor can be performed and at the same time, the fact that a small amount of catalyst can demonstrate a high degree of activity proves that this invention is economically feasible and with an easier process, advantageous in the industrial field.

What is claimed is:

1. A method for the selective hydrogenation of polymer containing conjugated diene in hydrogenating the double bonds only in the conjugated dienes of polymer, which is selected from a homopolymer of conjugated diene monomer or a copolymer consisting of a conjugated diene monomer and aromatic vinyl monomer, wherein it comprises:
   1) at least one conjugated diene is individually polymerized or copolymerized to create a living polymer using an organolithium compound as initiator;

2) the end of the living polymer, so formed, is treated using an equimolar amount of an end-modifying material; and, 3) a monocyclopentadienyl titanium compound expressed by the following formula 1 and lithium hydride (LiH), so prepared via the reaction between an organolithium compound and hydrogen are added to the polymer in solution whose end is modified but lithium hydride may be added individually or in a mixed form with catalyst by premixing Formula 1

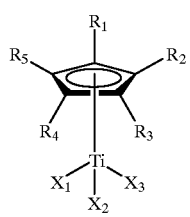

wherein, $R_1$, $R_2$, $R_3$, $R_4$ and $R_5$, which may be same or different, are selected from hydrogen atoms and alkyl groups of 1~5 carbon atoms; $X_1$, $X_2$ and $X_3$, which may be same or different, are selected from halogen atoms.

2. The method for the selective hydrogenation of polymer containing conjugated diene according to claim 1, wherein the conjugated diene monomer and vinyl aromatic monomer in a copolymer is mixed in the range of 0.5:9.5~9.5:0.5 wt %.

3. The method for the selective hydrogenation of polymer containing conjugated diene according to claim 1, wherein the molar ratio of lithium hydride (LiH) and titanium compound (catalyst) is in the range of 2/1~30/1.

4. The method for the selective hydrogenation of polymer containing conjugated diene according to claim 1, wherein said lithium hydride (LiH) is prepared from the reaction of an organolithium compound and gaseous hydrogen in solution.

5. The method for the selective hydrogenation of polymer containing conjugated diene according to claim 1, wherein the compound expressed by a formula 1 include one or more compounds selected from the group consisting of cyclopentadienyl titanium trichloride, cyclopentadienyl titanium trichloride, cyclopentadienyl titanium tribromide, cyclopentadienyl titanium triiodide, pentamethylcyclopentadienyl titanium trichloride, pentamethylcyclopentadienyl titanium tribromide, pentamethylcyclopentadienyl titanium trifluoride and pentamethylcyclopentadienyl titanium triiodide.

6. The method for the selective hydrogenation of polymer containing conjugated diene according to claim 1, wherein said hydrogenation is performed under the following reaction conditions: temperature (0~150° C.), pressure (1~100 kg.f/cm²), catalyst amount (0.01~20 mmol per 100 g of polymer and time (15~1440 minutes).

7. The method for the selective hydrogenation of polymer containing conjugated diene according to claim 1, wherein said hydrogenation is performed under the following reaction conditions: temperature (50~140° C.), pressure (5~20 kg.f/cm²), catalyst amount (0.05~5 mmol per 100 g of polymer and time (30~360 minutes).

8. The method for the selective hydrogenation of polymer containing conjugated diene according to claim 1, wherein the double bonds of conjugated diene are hydrogenated by more than 90%, while those of aromatic vinyl are hydrogenated by less than 5%.

9. The method for the selective hydrogenation of polymer containing conjugated diene according to claim 1, wherein said hydrogenation is performed in such a manner that the concentration of polymer to a solvent is in the range of 1~50 wt %.

10. The method for the selective hydrogenation of polymer containing conjugated diene according to claim 2, wherein the double bonds of conjugated diene are hydrogenated by more than 90%, while those of aromatic vinyl are hydrogenated by less than 5%.

11. The method for the selective hydrogenation of polymer containing conjugated diene according to claim 3, wherein the double bonds of conjugated diene are hydrogenated by more than 90%, while those of aromatic vinyl are hydrogenated by less than 5%.

12. The method for the selective hydrogenation of polymer containing conjugated diene according to claim 4, wherein the double bonds of conjugated diene are hydrogenated by more than 90%, while those of aromatic vinyl are hydrogenated by less than 5%.

13. The method for the selective hydrogenation of polymer containing conjugated diene according to claim 5, wherein the double bonds of conjugated diene are hydrogenated by more than 90%, while those of aromatic vinyl are hydrogenated by less than 5%.

14. The method for the selective hydrogenation of polymer containing conjugated diene according to claim 6, wherein the double bonds of conjugated diene are hydrogenated by more than 90%, while those of aromatic vinyl are hydrogenated by less than 5%.

15. The method for the selective hydrogenation of polymer containing conjugated diene according to claim 7, wherein the double bonds of conjugated diene are hydrogenated by more than 90%, while those of aromatic vinyl are hydrogenated by less than 5%.

16. The method for the selective hydrogenation of polymer containing conjugated diene according to claim 3, wherein said lithium hydride LiH is prepared from the reaction of an organolithium compound and gaseous hydrogen in solution.

17. The method for the selective hydrogenation of polymer containing conjugated diene according to claim 6, wherein said hydrogenation is performed under the following reaction conditions: temperature 50–140° C., pressure 5–20 kg.f/cm², catalyst amount 0.05–5 mmol per 100 g of polymer and time 30–360 minutes.

* * * * *